US007123546B2

(12) United States Patent
Zimmerman et al.

(10) Patent No.: US 7,123,546 B2
(45) Date of Patent: Oct. 17, 2006

(54) PROCESSING TECHNIQUE FOR FORWARD LOOKING SONAR

(75) Inventors: Matthew Jason Zimmerman, Providence, RI (US); Matthew Alden Coolidge, Narragansett, RI (US); Evan Mikel Lapisky, Narragansett, RI (US)

(73) Assignee: FarSounder, Inc., Providence, RI (US)

( * ) Notice: Subject to any disclaimer, the term of this patent is extended or adjusted under 35 U.S.C. 154(b) by 247 days.

(21) Appl. No.: 10/856,871

(22) Filed: Jun. 1, 2004

(65) Prior Publication Data
US 2005/0007880 A1    Jan. 13, 2005

Related U.S. Application Data

(60) Provisional application No. 60/474,402, filed on Jun. 2, 2003.

(51) Int. Cl.
*G01S 15/89*    (2006.01)
(52) U.S. Cl. .......................... 367/103; 367/88; 367/11
(58) Field of Classification Search ................ 367/103, 367/88, 11
See application file for complete search history.

(56) References Cited

U.S. PATENT DOCUMENTS 5,200,931 A * 4/1993 Kosalos et al. ............... 367/88
6,842,401 B1 * 1/2005 Chiang et al. .............. 367/138

* cited by examiner

*Primary Examiner*—Dan Pihulic
(74) *Attorney, Agent, or Firm*—Mark S. Leonardo; Brown Rudnick Berlack Israels LLP

(57) ABSTRACT

A processing technique and transducer field of view architecture for use as part of an imaging sonar system to develop three-dimensional images of the space below, to the sides, and forward of a ship.

11 Claims, 10 Drawing Sheets

PROCESSING TECHNIQUE FOR FORWARD LOOKING SONAR

PRIORITY

Priority is claimed to U.S. patent application Ser. No. 60/474,402, which was filed on Jun. 2, 2003.

BACKGROUND

An essential part of any forward looking sonar system is the ability to successfully utilize the data presented by the system. Typically, beamformed data is used to determine the location of objects within a volume of fluid, hereby defined as targets. Traditional beamformed data can be ambiguous to the interpreter be it a human or another system, due to it's complexity and/or the existence of various sources of noise within the data such as surface noise and sidelobes. Thus, a need exists to extract the essential target information from a set of beamformed data while eliminating sources of noise. Traditional display systems have tried to simplify the display by simply finding and displaying a single point within each beam of the beamformed data set. These systems are often called profiling sonars. Common single point detection routines extract these points by finding the "critical" bin along each beam. This critical bin may be defined in many ways. Two common definitions are: 1. the bin which contains the strongest signal within a beam, or 2. the first bin within a beam when moving away from the sonar point of origin to contain a signal above a specified threshold. This approach can be moderately effective in simple environments using only 2-dimensional beamformed data. This approach does not utilize any correlation techniques and each bin, target, and beam is evaluated independently of every other bin, target and beam. This approach is often lacking in image quality for complicated or 3-dimensional beamformed data sets. A better way of extracting data from a 3-dimensional beamformed data set, particularly for use in forward-looking applications, and a way which can improve image quality through correlation techniques is desirable.

SUMMARY OF THE INVENTION

The invention defined in this application extracts target information from a set of beamformed data and also provides for the removal of various sources of noise. Targets are intelligently extracted from the beamformed data set through the use of correlation techniques. These correlation techniques can include, but are not limited to spatial, temporal, spectral, and geometrical correlation factors. In many environments, a priori information can be used to improve image clarity. For example, in cases where a solid sea floor is detected or specified by the user or some other input into the system, potential targets detected by the sonar system which are located below the sea floor can be ignored. This is one example of reducing noise composed of spurious targets that are clearly not part of the actual sea environment. This application is not limited to marine environments and may be applied to any environment where 2 or 3-dimensional signal data is used.

DETAILED DESCRIPTION OF THE INVENTION

The invention will be described in connection with certain preferred embodiments, with reference to the following illustrative figures so that it may be more fully understood. With reference to the figures, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

A block diagram of the preferred embodiment of this system is given in figure 100. In the preferred embodiment, the beamformed data set is organized in such a way that each bin within the beamformed data can be referenced by angle index and range index. The angle index specifies the angle of the look beam, be it horizontal, vertical, or some other direction, while the range index specifies the range in sample space of a given bin. The beamformed data may also be organized in other ways as well, for example, the beamformed data may also be organized in such a way that bins can be referenced by spatial location. Note that in the preferred embodiment, it is beneficial, although not required, to utilize beamformed data in which the steer angle increments are of a higher resolution than the beam resolution determined by aperture of the sonar's array face.

Figure 2:
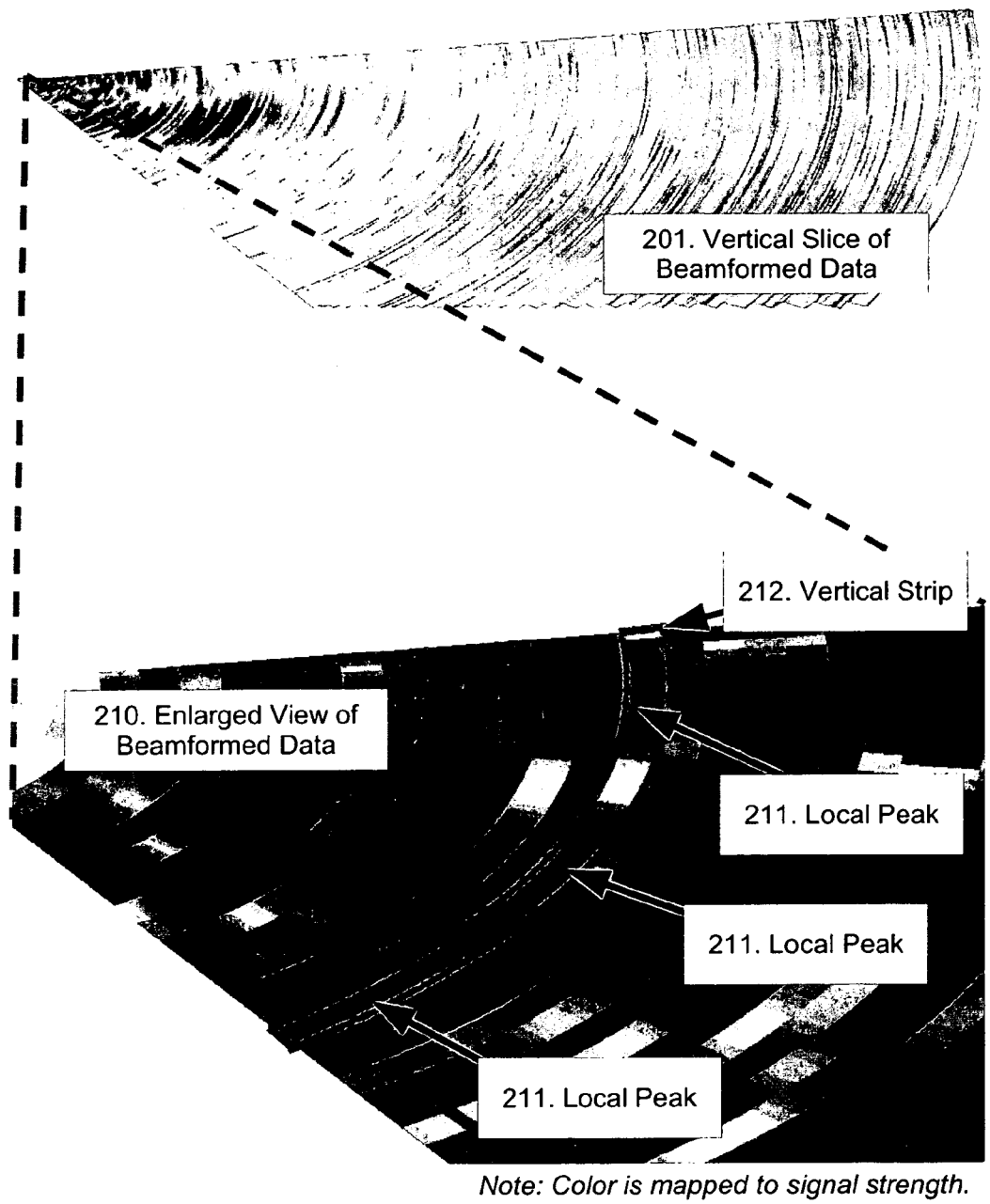
FIG. 2 is an illustration of local peak picking on a vertical slice of beamformed data.

A peak picking algorithm (110), is used to extract the local peaks of signal within the beamformed data which may or may not be match filtered. In the preferred embodiment, a vertical slice (all vertical angles and ranges for a given horizontal angle), as shown in FIG. 2, of beamformed data (201) is run through the peak picking algorithm and the local peaks are determined by finding a given number of local peaks within each vertical strip (212) of the beamformed data. Here, a vertical strip is defined as a vector of beamformed data such that for a given horizontal angle index and range index, every vertical angle for those given indices is searched. While in the preferred embodiment it is desirable to find up to three local peaks per vertical strip, the number of local peaks searched for can be adjusted to suit the needs of the application. Furthermore, the number of local peaks searched for may be adjusted to dynamically change during the search of a data set due to various factors alone or in combination such as: range, vertical angle index, horizontal angle index, signal strength, historical data from previous pings or other sources, or user/system defined areas interest and/or non-interest. Depending on the application, the search space may also be altered to any subset of the beamformed data up to and including the entire set of beamformed data. Other embodiments of the peak picking algorithm may also include advanced peak picking schemas which are designed to compliment the detection of multipath reflections.

Figure 1:
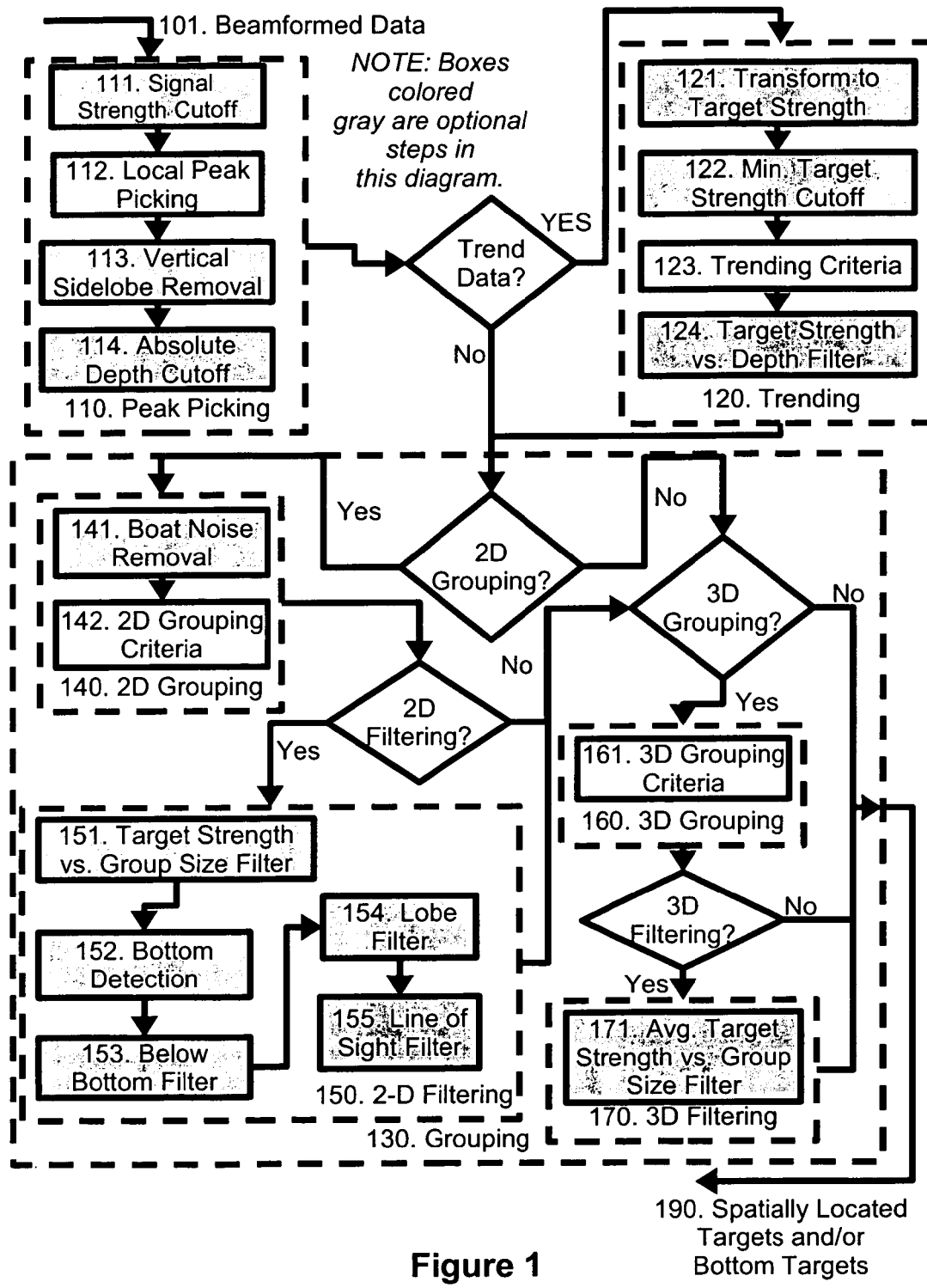
FIG. 1 is a block diagram overview of the processing flow.

As shown in FIG. 1 this invention includes a number of filters (111, 113, 114) within the peak picking phase. In the preferred embodiment, prior to finding the peaks, this invention includes an optional filter which removes any bins that are below a given signal strength (111). This filter may be adjusted according to the needs of the application to have a maximum cutoff, or remove any set of signal within any given range of signal strengths. This filter may also be adjusted to vary with range, depth, historical information, etc.

As shown in FIG. 1, an optional sidelobe removal filter (113), in the preferred embodiment of this invention, removes vertical sidelobes based on signal strength. In the preferred embodiment, each set of peaks within a vertical strip is run through the optional sidelobe filter, which reduces future inaccurate target detection due to vertical sidelobes by removing peaks that are determined to be vertical sidelobes of another peak. Various other embodiments of this filter may include a horizontal sidelobe filter, or a sidelobe filter in any other direction. Furthermore, this filter may be altered to detect sidelobes on larger or smaller subsets of the peaks found within the beamformed data depending on the needs of the application. Also, this filter may be adapted in the way that it removes sidelobes based on range, depth, bearing, historical data, and/or any other common signal properties.

Figure 3:
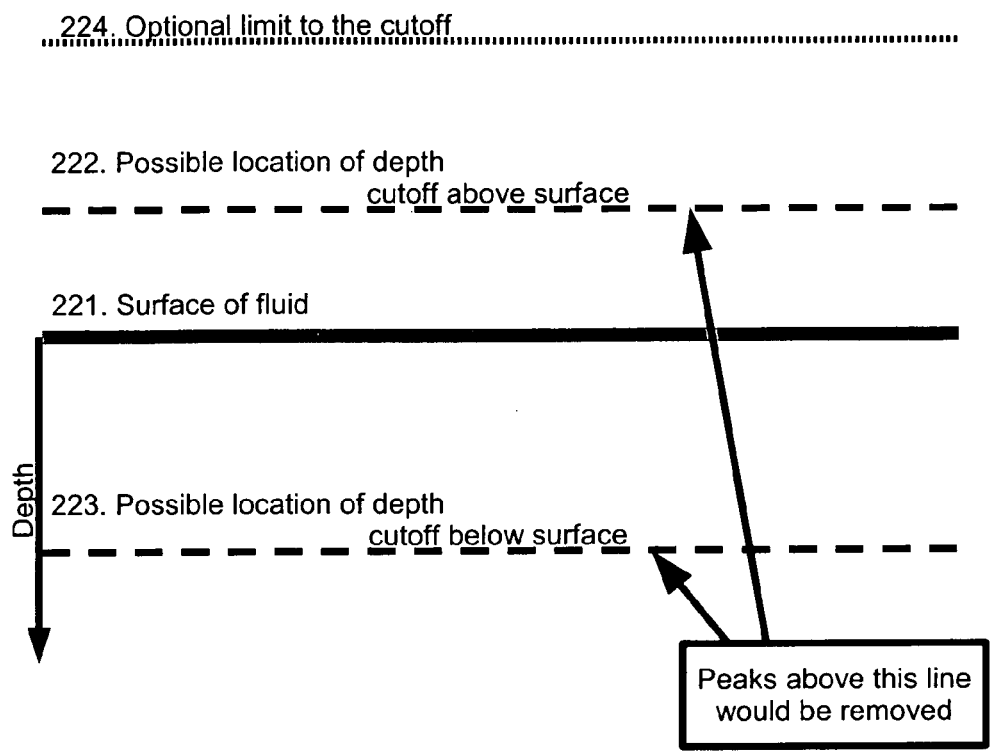
FIG. 3 is an illustration of removing peaks above an absolute depth cutoff.

The peak picking phase (110) of the preferred embodiment also optionally filters to remove any peaks that fall within a spatial location that is above some cutoff (114) as illustrated in FIG. 3. This filter removes any peaks that are above a given distance above (222) or below (223) the surface of the fluid (221). This filter may be adapted in other embodiments to remove peaks that are located in other spatial, angle, or range locations deemed to be invalid. Furthermore, this filter may be adapted to not remove peaks that are determined to be a given distance above the surface (224) in order to facilitate the detection of multipath reflections.

FIG. 1 also shows the Trending (120) portion of this invention. During Trending, the previously found local peaks are filtered in order to remove those of which have high probabilities of being due to noise in the system. In the preferred embodiment, the signal strength corresponding to each peak are converted to target strength, which is signal strength normalized for range (121). Other embodiments of this invention may not transform signal strengths into target strength, or may correlate them based on other common signal properties, including but not limited to spatial location, historical data, angle index, etc. The preferred embodiment also includes an optional filter to remove peaks which have target strengths below a given value (112). This filter may be adapted in other versions of this invention to filter peaks based on other criteria (depth, angle index, range, classification information, historical information, other common signal properties) alone or in conjunction with the peak's target strength.

Figure 4:
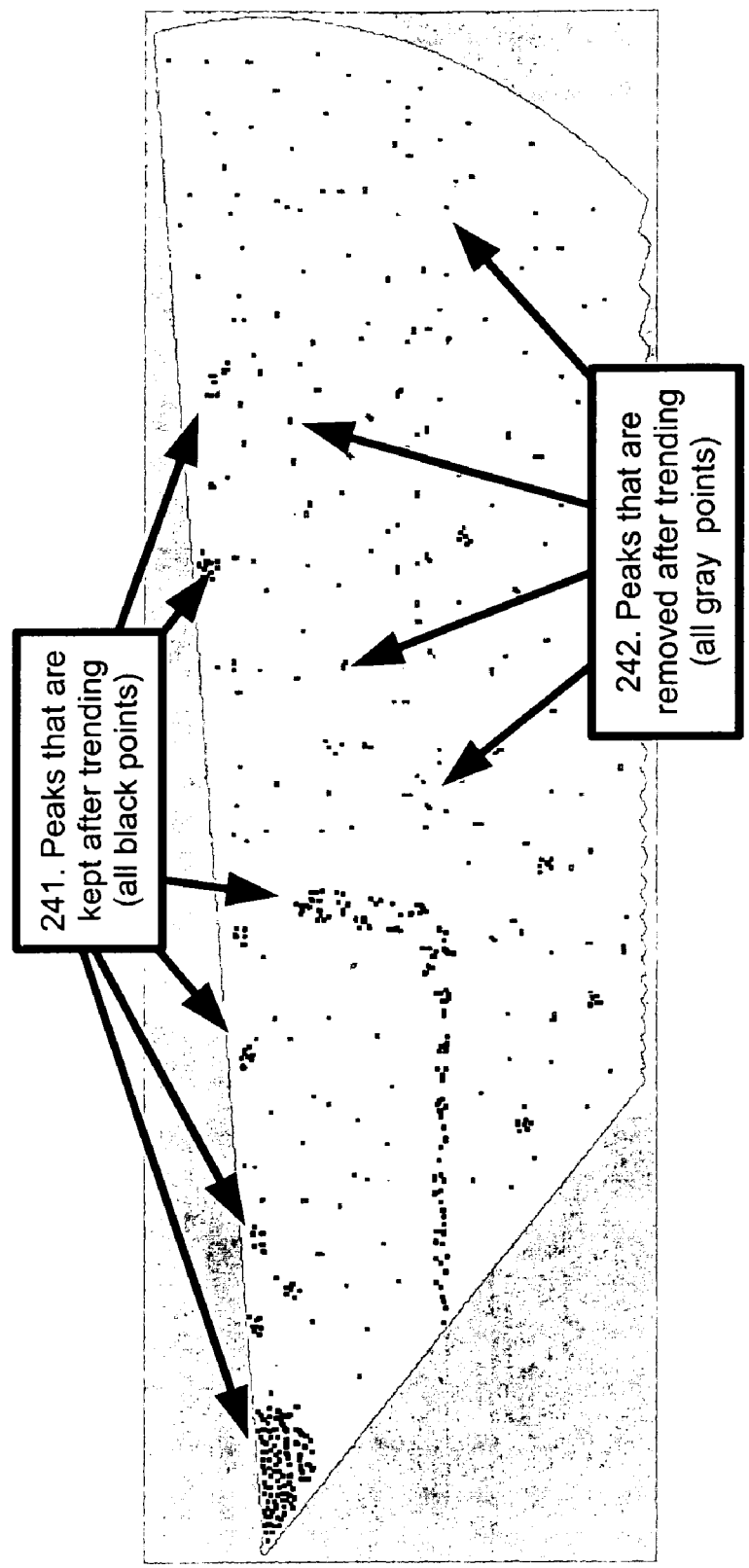
FIG. 4 is an illustration of a vertical slice through the 3D data where typical results of trending phase where potential targets determined to be noise are removed from the potential target data set.

FIG. 4 depicts the results of the preferred embodiment of the trending criteria (123) on peaks from a vertical slice of beamformed data. Here, all black points represent peaks which have been determined to be valid by the trending criteria. All gray points represent peaks which have been determined to be invalid by the trending criteria. In the preferred embodiment of this invention, peaks are considered valid by the trending criteria if they are located "close" to other peaks in the index space of the beamformed data. This notion of closeness is defined within the Target Modeling in a way that best suits the needs of the system. Various other embodiments of this invention may utilize different trending criteria based on common signal properties if they are deemed better suited for a given application. While the preferred embodiment of this algorithm trends on two dimensional vertical slices of peaks, other methods of trending may be employed in variations of this embodiment. These other methods may include, but are not limited to trending on other two dimensional sets of peaks (such as a horizontal slice), trending in non-two dimensional sets of peaks (one or three dimensions for example), and/or trending in stages with various trending schemas. One example of trending in stages would be trending all peaks on their two dimensional vertical slices, and then re-trending those peaks on their two dimensional horizontal slices.

In the preferred embodiment of the Trending phase, an optional filter (124) is included which reduces surface noise by removing some peaks based on their target strength and depth. The target strength and depth settings may be adjusted by the system or another person/system in order to increase/decrease the amount of surface noise that makes it through this filter. Various other embodiments of this filter may include filtering based on other common signal properties including but not limited to range, signal strength, and historical data.

Figure 5:
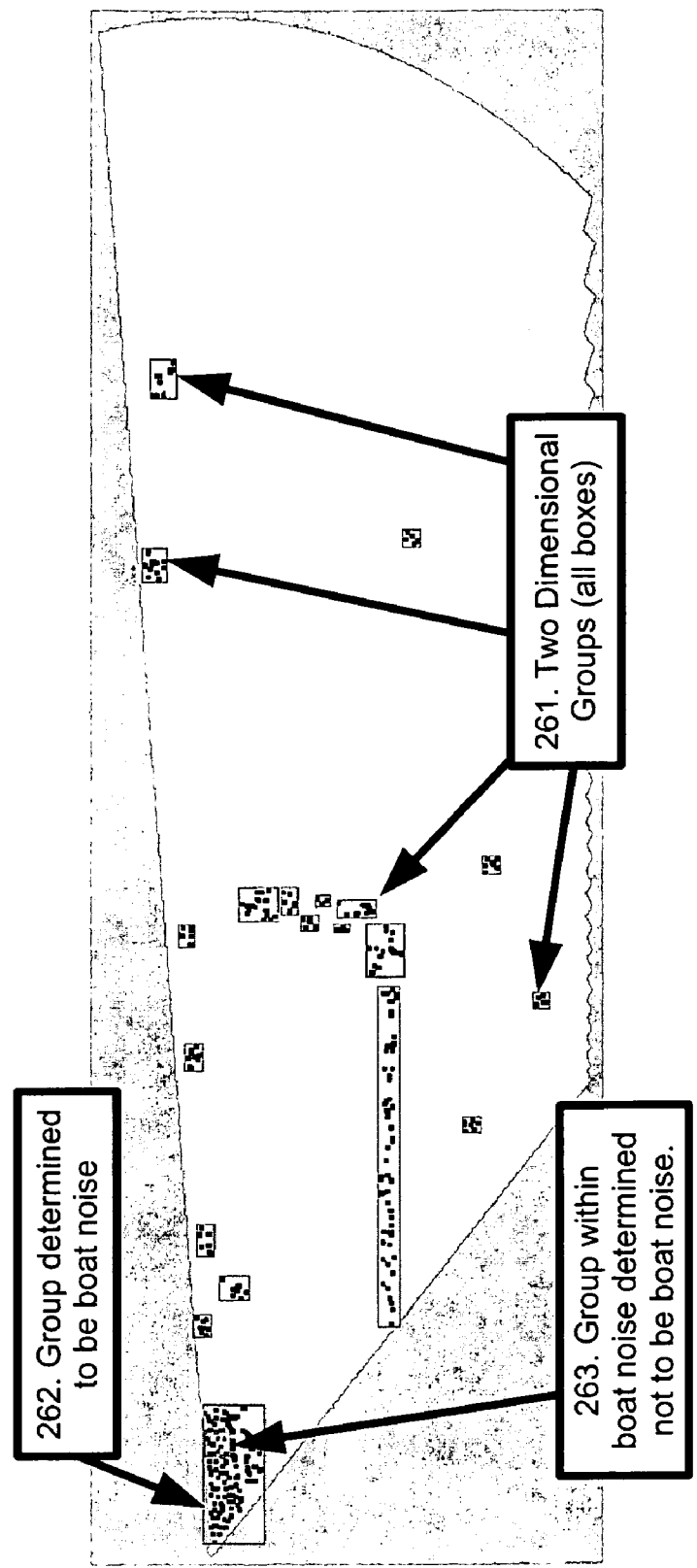
FIG. 5 is an illustration of a vertical slice through the 3D data where potential targets are grouped together in 2 dimensions.

During the grouping phase (130), peaks are grouped together in various ways to create targets. In the preferred embodiment, peaks in each vertical slice are first grouped according to their spatial location (140). The results of a typical grouping are depicted in FIG. 5. In the preferred embodiment of this algorithm, peaks are grouped together to form boxes of peaks (261, 262). In the preferred embodiment, a peak is determined to belong to a given group according to its closeness to that group. This embodiment groups peaks together based on how close a peak falls to within a groups extents, which in this embodiment is defined as a rectangle that encloses all the peaks in that group. There are several variations of this embodiment which may be utilized along with, or independently of this embodiment, depending on the needs of the application. Some of the other two dimensional grouping options may include, but are not limited to:

Grouping peaks using different geometric shapes.
Grouping peak using common signal properties such as signal strength and/or target strength
Grouping peaks based on historical data
Grouping peaks based on classification routines Furthermore, the grouping algorithm(s) may be varied according to a number of parameters, including but not limited to range, depth, historical data, and classification information, along with any common group information such as group size, group extents, the number of peaks in the group, the signal strength of the group as determined by any type of averaging, the group's target strength as determined by any type of averaging, and group density, to name a few.

The preferred embodiment also includes an optional filter (141) to remove boat noise from the target data. In the preferred embodiment, a peak is first considered as a candidate for the boat noise group based on its spatial location and target strength. If this peak meets these criteria, then it is grouped with the boat noise, otherwise it will be placed with another group of peaks. By taking the peak's target strength into account, peaks that spatially fall within the boat noise group can be grouped into a group that better match that peak's characteristics (263). While the preferred embodiment includes a boat noise filter before the two dimensional grouping, other embodiments may include this filter at a different stage of the Target Modeling if it better suits the needs of that application. Also, although this embodiment groups boat noise based on spatial location and target strength, other embodiments may place peaks into the boat noise group based on several other characteristics of a peak including but not limited to classification information, historical information, and any other common signal properties.

Figure 6:
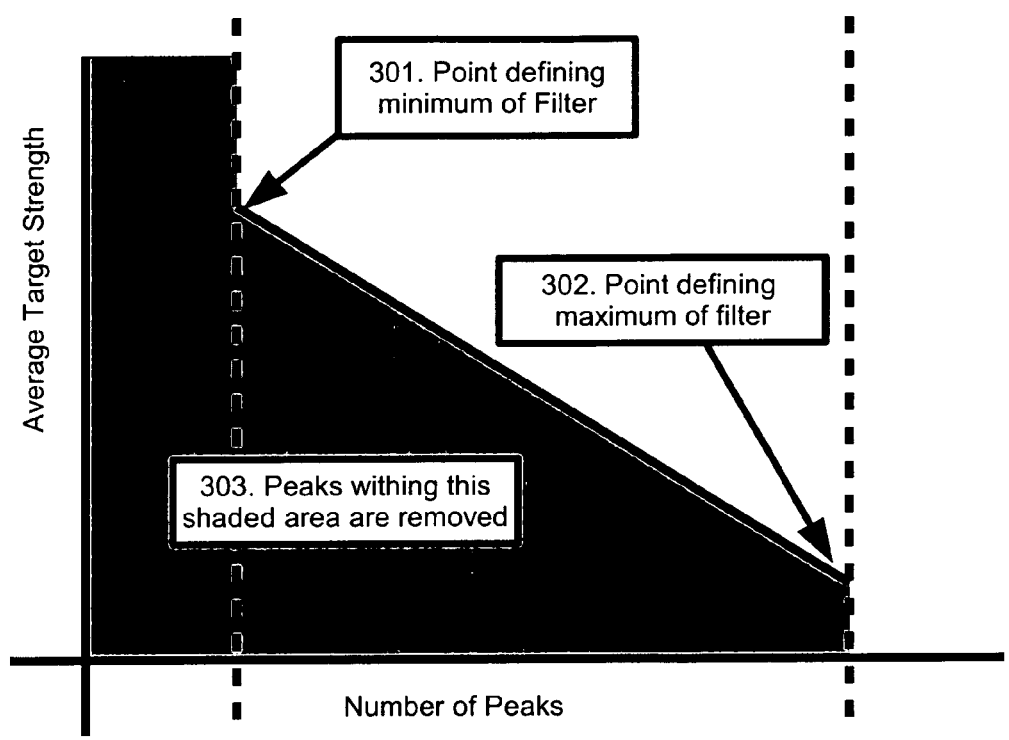
FIG. 6 is an illustration of the filter logic which uses the number of peaks versus the average target strength to filter the data.

The preferred embodiment of this invention includes a set of filters (150) which can be used to further enhance the results of the two dimensional grouping phase. In the preferred embodiment, the first filter (151) removes some of the 2D groups based on a linear function of the number of peaks in a group and the average target strength of that group as shown in FIG. 6. The preferred embodiment removes any groups which fall within the area defined by the filter as invalid (303). The points which define the bounds of this area (301 and 302) can be modified to increase/decrease the filter based on the needs of the system/user. Depending on the embodiment, this adjustment may be performed directly by modifying the points (301 and 302), or indirectly via the use of a control that specifies certain settings for the filter (high, medium, and low for example). While the preferred embodiment uses a linear filter based on number of peaks in the group and the groups average target strength, this filter may be modified in several ways, depending on the needs of the application. Various other embodiments of this filter may include, but are not limited to filtering based on historical data, group characteristics, classification information, depth information, range information, and other common signal characteristics alone or in conjunction depending on the needs of the application. This filter may also manifest its self as a non-linear and/or non-continuous function.

Figure 7:
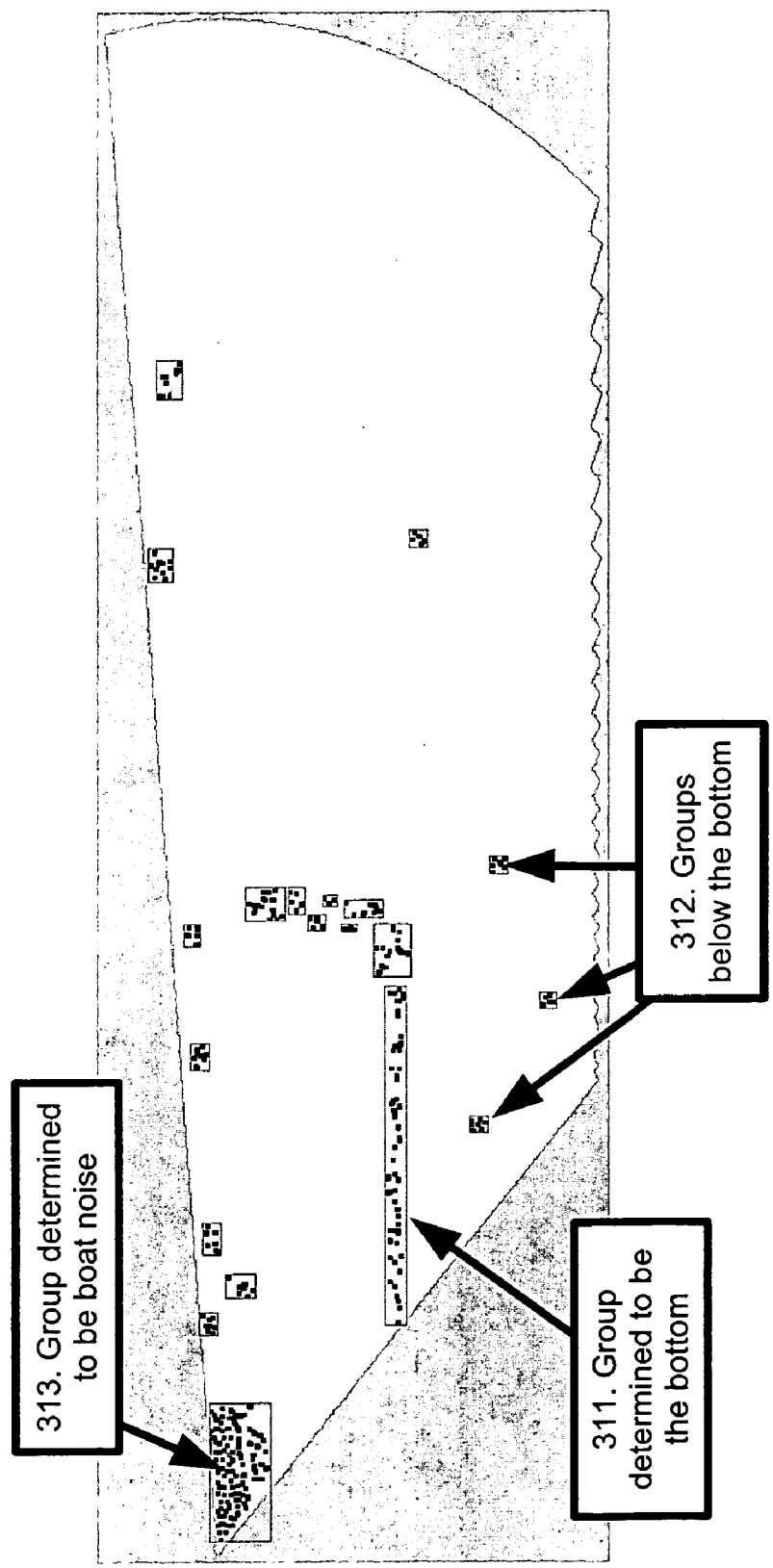
FIG. 7 is an illustration of how the sea floor is identified in the 2 dimensional data.

The next step in the 2D filtering is the bottom detection (152). In the preferred embodiment, the trended data is grouped in 2D as shown in FIG. 7. The group closest to the sonar head is generally specified as boat noise (313). The bottom is found on each vertical slice by finding the group comprised of the greatest number of peaks which has been determined not to be boat noise (311). Once this group is found, the preferred embodiment also includes a filter (153) to remove the groups which are located below the bottom (312). Although the preferred embodiment detects the bottom by finding the largest target, other algorithms embodiments of this invention may employ other techniques to find the bottom. These techniques may include but are not limited to, finding the bottom based on classification techniques, historical data, common signal properties, group location, group target strength, peak target strengths, and group shape to name a few.

In the preferred embodiment, all non-bottom groups are filtered to remove peaks that are below a given threshold of the maximum signal strength value for that group of peaks with a lobe filter (154). Other embodiments may have variations to this lobe filter, including but not limited to, using other measurements for the lobe such as target strength, or other common signal properties.

A line of sight filter (155) is also included in the preferred embodiment of this invention. The line of sight filter, is used to smooth the groups which have been determined to be the bottom. This smoothing is performed by relocating peaks which fall outside the line of sight of the sonar's face. Generally, a peak will be outside the line of sight of the array face when it is behind a closer peak in the data.

While not included in this embodiment, certain applications may also require that a moving average filter also be used to smooth the bottom. In such embodiments, this filter would use a normalization factor determined by the local average of the depth along a given bottom profile to normalize the depths of the points which make Lip that bottom profile. This filter may also utilize other information when filtering the bottom including but not limited to classification information, common signal properties, historical information, and range information to name a few.

In the preferred embodiment, the 3D groups are formed by combining 2D groups created for each vertical slice of peak data (160). This particular embodiment groups the 2D groups based on their spatial proximity to each other, along with their groups size.

Two dimensional groups from adjacent vertical slices are compared to each other to determine if they belong in a 3D group together. Along with their spatial proximity, groups are also grouped based on the size of the groups, so that 3D groups are comprised of 2D groups that are spatially close to one another, as well as similar in size. While this embodiment groups 2D groups together to create 3D groups, other embodiments may group differently based on their needs. Some examples of other 3D grouping algorithms may include, but are not limited to:

Grouping individual peaks or 2D groups based on common signal characteristics

Grouping individual peaks or 2D groups based on classification techniques

Grouping individual peaks or 2D groups based on group characteristics

Grouping individual peaks or 2D groups based on other common 3D grouping techniques.

The preferred embodiment includes a three dimensional filtering algorithm (170). This filter works similarly to the target strength versus groups size filter (151). For the 3D version of this filter, the number of points in the 3D group along with the average target strength of that group is passed to the 3D filtering function. As with the target strength versus groups size filter, groups which evaluate to being invalid (303) are removed from the set of groups. The points (301 and 302) which define the valid and invalid areas can be adjusted by the system/user to best suit the needs of the application. Furthermore, similarly to the 2D filter, this filter may be modified in several ways, depending on the needs of the application. Various other embodiments of this filter may include, but are not limited to filtering based on historical data, group characteristics, classification information, depth information, range information, and other common signal characteristics alone or in conjunction depending on the needs of the application. This filter may also manifest its self as a non-linear and/or non-continuous function.

Depending on the needs of the application, there are several other filtering possibilities which may be utilized by other embodiments of this invention. One such filter would be a line of sight filter for two dimensional and/or three dimensional groups. This line of sight filter would remove groups that are obstructed by other groups from the line of sight of the sonar's array face. Furthermore, any/all of the filters within this embodiment, or within other embodiments may be modified in order to utilize Time Varying Gain (TVG) techniques known in the art when analyzing the data. Other embodiments of this invention, especially those in a wider band system, may utilize spectral information within any of the existing filters, or within new filters in order to further analyze, filter, classify or group the data.

The above processing techniques can be used with various transmit techniques where the described 2D techniques can be used on all types of sonars that generate 2D or 3D images with either single or multiple pings and the described 3D techniques can be used on sonars that create 3D images either through single or multiple pings.

In addition to the above processing techniques, the invention may include but is not limited to the following transmit techniques.

Figure 8:
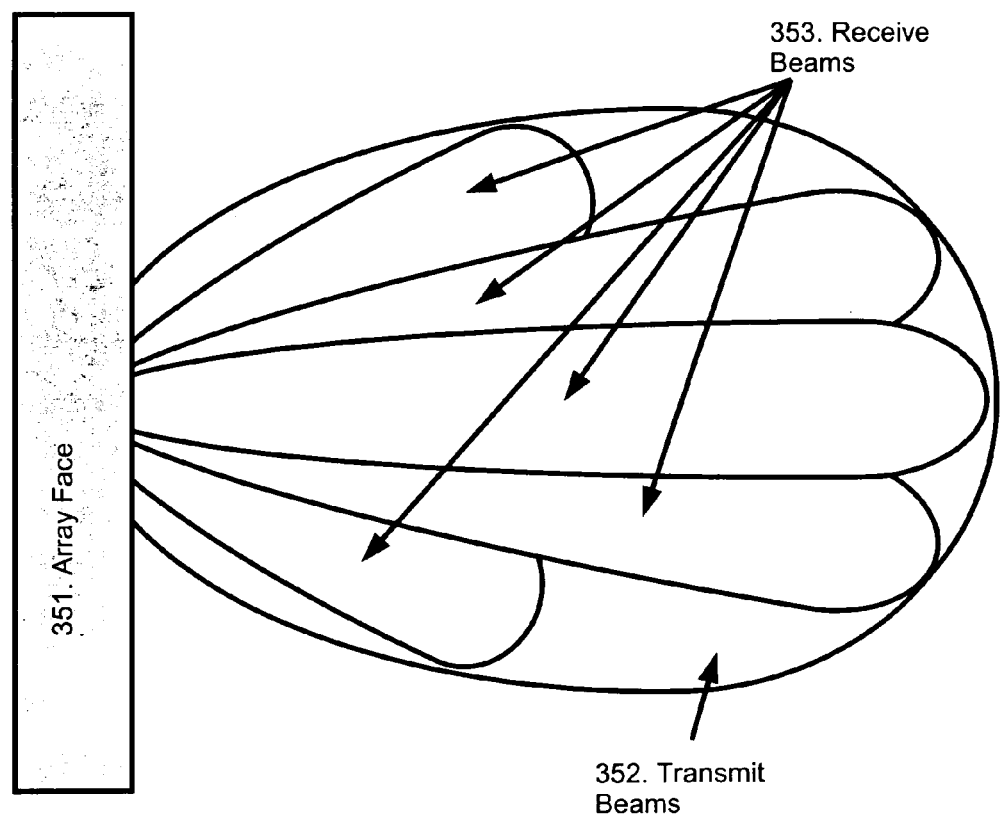
FIG. 8 is an illustration of the transmit and receive beam patterns and spatial relation in relation to the sonar system's transducer array face location.

One transmit technique is to use standard 3D image generation transmit techniques such as a single broad beam transmit with multibeam receivers as shown in FIG. 8.

In order to increase the sound pressure level at a given point, a transmitter with increased directivity can also be used. In doing so, the transmitter concentrates the transmit signal into certain areas more than others and narrows the field of view yet increases the power within the given field of view versus a less directive transmitter.

Figure 9:
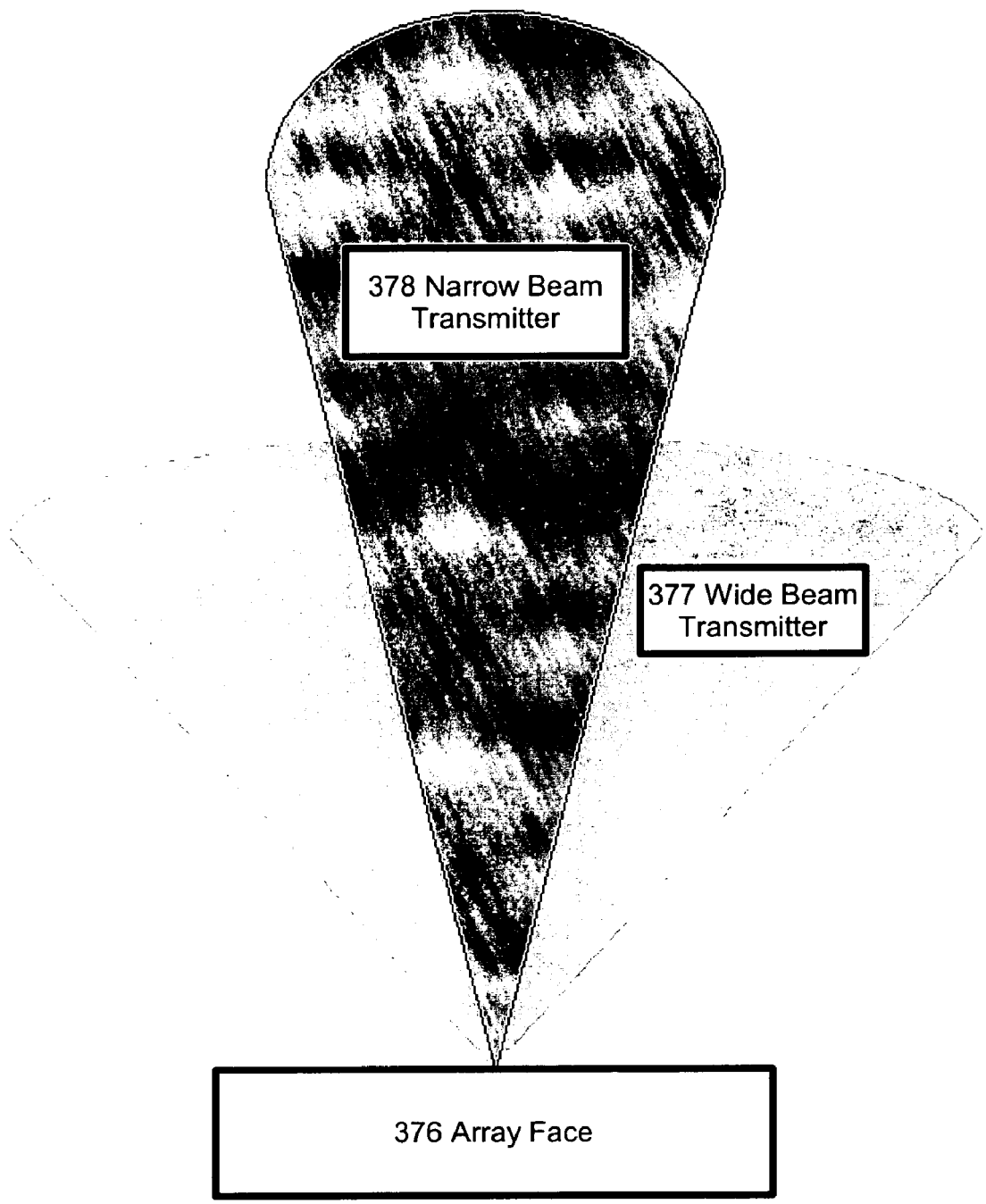
FIG. 9 is an illustration of the use of a wide field of view transmitter with narrow field of view transmitter as part of a single sonar system.

Another transmit technique is to use the multiple transmitters and alternate transmissions between the various transmitters. In this configuration, each transmitter should be configured in such a way that the transmit beam falls within the receiver or receivers beam pattern or patterns. In the preferred embodiment, this configuration allows for one or more transmitters each with a wide beam pattern allowing for wide field of view image generation with a single ping and one or more transmitters each with narrower beam patterns as shown in FIG. 9. The narrower beam transmitters have a higher directivity and can produce high sound pressure levels within their beam as compared to the wider beam transmitters for a given amount of electrical input energy assuming that the transmitters are made from the same or similar materials and have similar amounts of surface area. Varying transmissions between a wide and narrow transmit beam allows for the rapid generation of both a wide field of view image with a shorter maximum range and a narrow field of view field of view with a longer maximum range. For vessel navigation this is particularly useful, because the long range beam can give early warning to potential obstacles while the wide field of view beam can give the operator the necessary information on which to base a course change, should one be necessary to avoid an obstacle detected in the long range mode. This technique is different than the multiple transmitter or multiple transmitter frequency technique that is employed in traditional depth-sounders. Traditional depth sounders vary the beam width of a single fixed beam. This single beam width directly controls the resolution of the depth-sounder. They do not employ phased arrays to perform beam steering. Whereas in the disclosed invention, transmitter beamwidth is not used to determine resolution and beam steering is performed electronically in receive. Additionally, limiting the processing field of view at longer ranges to the beam width of the transmitter is a way to minimize processing time for longer range image creation. This technique may be expanded to include multiple longer range subsets of the total shorter range wide field of view.

Figure 10:
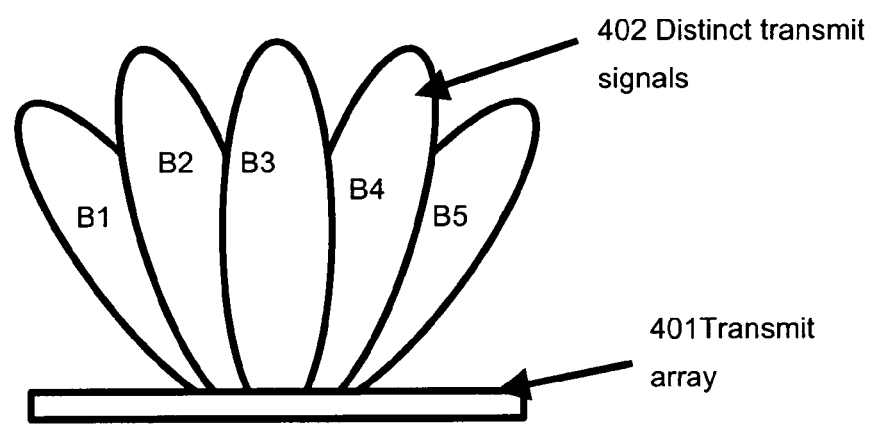
FIG. 10 is an illustration of multiple narrow field of view transmitters combined to build a wide field of view coverage sector.

Another transmit technique is to cover a larger field of view with multiple transmitters steered to multiple areas to fill a large field of view with a series of pings. In this embodiment, the invention transmits multiple pings at multiple angles one right after the other in series and listen for returns from all transmit signals at the same time as shown in FIG. 10. Each ping will have a different start time. Because there is only one listening stage and one set of receive hardware for all pings, something must be done to differentiate between each transmission in order to process the distance accurately at each angle. It is unimportant if the beam patterns of the various transmissions overlap each other since the various transmissions are not used to differentiate angle. Unlike traditional systems where, a single ping is transmitted and all echoes are received followed by the next steered transmit signal repeating the process until the large field of view is completely filled this embodiment of the invention does not rely on transmit beam direction to discern target direction.

Transmission differentiation can be done by having each transmit ping transmit within a different transmit range having different, non-overlapping signal bandwidths. Each ping can then be extracted from the others by a multiple of ways such as:

having a separate bank of band pass filters and digitizing electronics for each band using band pass or over sampling techniques.

full bandwidth sampling the entire range of bandwidths and signals and then digitally filtering using one set of analog electronics and digitizing electronics.

using bandpass signaling techniques over the entire range of bandwidths and the digitally filtering the bandpass signal into the separate bands.

Another way to differentiate the signals is to transmit orthogonal codes on each of the pings so that each transmit signal has separate and distinct matched filters.

The value of this invention is that directivity advantages can be gained without sacrificing field of view or full field of view refresh time.

The invention claimed is:

1. A sonar processing system, comprising:
    a processing technique to derive signal strength field information as a function of 2-dimensional location;
    a processing technique to extract location and signal strength information from said field for valid targets using a vertical slice peak picker to select a subset of the signal strength field as potential targets;
    a processing technique which reduces false targets in the extracted data through correlation techniques;
    a processing technique which groups individual signal locations into groups.

2. A sonar processing system as in claim 1 where the processing technique to derive signal strength field information as a function of location is beamforming.

3. A sonar processing system as in claim 1 where the signal strength field is a function of 3-dimensional location.

4. A sonar processing system as in claim 1 where group location information is used to classify targets within a group.

5. A sonar processing system as in claim 4 where group classification information is used to display group targets differently in a user interface.

6. A sonar processing system as in claim 4 where group location and classification information is used to trigger alarms.

7. A sonar processing system as in claim 1 where target location relative to depth is used to remove targets from further processing, consideration, or display.

8. A sonar processing system as in claim 3 where group location relative to other groups is used to remove targets from further processing, consideration, or display.

9. A sonar processing system as in claim 4 where the sea floor is detected automatically based on group locations and the number of group members.

10. A sonar system, comprising:
a sonar processing as in claim 1;
at least 2 transmitters with varying field of views;
a receive system with a field of view which encompasses all the field of views generated by the transmitters;
a control system designed to switch electronics between transmitters and processing parameters set to correspond to said transmitters where said controller allows for the transmission and reception of a single ping before the next transmission allowing each transmission to be differentiated in time.

11. A sonar system, comprising:
a sonar processing as in claim 1;
at least 2 transmitters with varying field of views;
a receive system with a field of view which encompasses all the field of views generated by the transmitters;
a control system designed to switch electronics between transmitters and processing parameters set to correspond to said transmitters where said controller allows for the transmission and reception of multiple pings on multiple transmitters before complete return echoes are received where each ping is differentiated by non-overlapping signal bandwidths.

* * * * *